(12) United States Patent
Erera et al.

(10) Patent No.: US 8,838,571 B2
(45) Date of Patent: Sep. 16, 2014

(54) DATA-DISCRIMINATE SEARCH ENGINE UPDATES

(75) Inventors: Shai Erera, Kiryat Ata (IL); Laurent Hasson, New York, NY (US); Eitan Shapiro, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 12/825,301

(22) Filed: Jun. 28, 2010

(65) Prior Publication Data
US 2011/0320428 A1    Dec. 29, 2011

(51) Int. Cl.
*G06F 17/30* (2006.01)

(52) U.S. Cl.
CPC .................. *G06F 17/30864* (2013.01)
USPC ............... 707/709; 707/710; 707/711

(58) Field of Classification Search
CPC .............. G06F 17/30876; G06F 17/30616; G06F 17/30631
See application file for complete search history.

(56) References Cited

U.S. PATENT DOCUMENTS

| | | | |
|---|---|---|---|
| 6,321,265 B1 | 11/2001 | Najork et al. | |
| 7,599,920 B1 | 10/2009 | Fox et al. | |
| 7,725,452 B1 * | 5/2010 | Randall | 707/709 |
| 7,774,782 B1 * | 8/2010 | Popescu et al. | 718/104 |
| 8,433,712 B2 * | 4/2013 | Koide et al. | 707/748 |
| 2003/0177179 A1 * | 9/2003 | Jones et al. | 709/203 |
| 2004/0225644 A1 | 11/2004 | Squillante et al. | |
| 2006/0282494 A1 | 12/2006 | Sima et al. | |
| 2007/0226174 A1 * | 9/2007 | Saito | 707/1 |
| 2007/0239701 A1 | 10/2007 | Blackman et al. | |
| 2011/0145216 A1 * | 6/2011 | Subramanya | 707/709 |

FOREIGN PATENT DOCUMENTS

WO    0150320    7/2001

OTHER PUBLICATIONS

Author: Michalangelo Diligenti, Marco Maggini, Filippo Maria Pucci; Title: "Desing of a Crawler with Bounded Bandwidth"; Date: May 2004; Publisher: WWW2004; Pertinent pp. 1-2 (renumbered).*
Cao, F., D. Jiang, and J.P. Singh, "Scheduling Web Crawl for Better Performance and Quality", Technical Report, TR-682-03, Oct. 2003, 11 pp. <URL:ftp://ftp.cs.princeton.edu/techreports/2003/682.pdf>.

(Continued)

*Primary Examiner* — Anh Tai Tran
(74) *Attorney, Agent, or Firm* — Janaki K. Davda; Konrad, Raynes, Davda & Victor LLP

(57) ABSTRACT

Techniques are provided for data-discriminate search engine updates, where, in accordance with a first crawling session frequency associated with a first update type, a search engine index is updated by recording an update to a first set of data, where the update to the first set of data is of the first update type, and, in accordance with a second crawling session frequency associated with a second update type, the search engine index is updated by recording an update to a second set of data, where the update to the second set of data is of the second update type, where the first crawling session frequency is of a different frequency than the second crawling session frequency.

20 Claims, 8 Drawing Sheets

(56) References Cited

OTHER PUBLICATIONS

Castillo, C., M. Marin, A. Rodriguez, and R. Baeza-Yates, "Scheduling Algorithms for Web Crawling", Proceedings of the WebMedia & LA-Web 2004 Joint Conference 10th Brazilian Symposium on Multimedia and the Web 2nd Latin American Web Congress, 2004, 8 pp. <URL:http://www.chato.cl/papers/castillo04_scheduling_algorithms_web_crawling.pdf>.

IBM Corp., "Web Content Management Crawlers", OmniFind Enterprise Edition, Version 8.5, [online] Feb. 2008, retrieved from the Internet at <URL: http://publib.boulder.ibm.com/infocenter/discover/v8r5m0/index.jsp?topic=/com.ibm.discovery.es.ad.doc/administering/iiysacwcm.htm>, 3 pp.

Pinkerton, B., "WebCrawler: Finding What People Want", A dissertation Submitted in Partial Fulfillment of the Requirement for the Degree of Doctor of Philosophy, 2000, 105 pp.<URL:http://thinkpink.com/bp/Thesis/Thesis.pdf>.

Xu, J., Q. Li, H. Qu, and A. Labrinidis, "Towards a Content-Provider-Friendly Web Page Crawler", Proceedings of the 10th International Workshop on Web and Databases, Jun. 2007, 6 pp. <URL:http://rodos.cs.pitt.edu:8090/aps/bib/02b15eaa12f09d910112f0cbc42d0001/webdb07.pdf>.

\* cited by examiner

DATA-DISCRIMINATE SEARCH ENGINE UPDATES

FIELD

The invention relates to computer-based search engines in general, and more particularly to performing data-discriminate search engine updates.

BACKGROUND

Information technologists have long recognized the need to properly index electronic content such that the content can be easily found by interested parties. In recent times search engine tools and technologies have evolved to address the need to discover and index electronic content published and accessible through computer networks, such as the Internet or private networks.

In order to automate the discovery of electronic content, software tools commonly known as "crawlers" traverse computer networks by navigating from electronic document to electronic document along hyperlinks embedded in the documents that indicate the locations of other documents. In this manner crawlers seek, acquire, and index electronic document content for later use by search engines.

A crawler often begins with a seed list that contains uniform resource locators (URLs) indicating the locations of electronic documents that are to be indexed. Seed lists are often prepared by publishers of electronic content who wish to make their content known to search engines so that others may access the content. Where seed lists are used, a crawler is often configured to perform an initial "full" crawling session of all electronic documents that are discoverable using a given seed list. Thereafter, and usually at scheduled intervals, the crawler is provided with seed lists that contain the URLs of only those electronic documents that have been updated since the previous crawling session. This reduces both the amount of time required to update the index as well as the load on the computer processing and storage infrastructure. While under this arrangement it is clear that the more frequently crawling sessions are scheduled to occur, the more up to date the index will be, this comes at a cost of placing a greater overall load on the computer processing and storage infrastructure than would be the case were crawling sessions scheduled to occur less frequently.

BRIEF SUMMARY

In certain embodiments, a method is provided for data-discriminate search engine updates, the method including in accordance with a first crawling session frequency associated with a first update type, updating a search engine index by recording an update to a first set of data, where the update to the first set of data is of the first update type, and, in accordance with a second crawling session frequency associated with a second update type, updating the search engine index by recording an update to a second set of data, where the update to the second set of data is of the second update type, where the first crawling session frequency is of a different frequency than the second crawling session frequency.

In certain embodiments, a system is provided for data-discriminate search engine updates, the system including a seed list manager configured to identify an update to a first set of data as being of a first update type, and identify an update to a second set of data as being of a second update type, and a crawler configured to in accordance with a first crawling session frequency associated with the first update type, update a search engine index by recording the update to the first set of data, and, in accordance with a second crawling session frequency associated with the second update type, update the search engine index by recording the update to the second set of data, where the first crawling session frequency is of a different frequency than the second crawling session frequency.

In certain embodiments, a computer program product of the invention is provided.

BRIEF DESCRIPTION OF THE SEVERAL VIEWS OF THE DRAWINGS

Embodiments will be understood and appreciated more fully from the following detailed description taken in conjunction with the appended drawings in which.

DETAILED DESCRIPTION

Figure 1A:
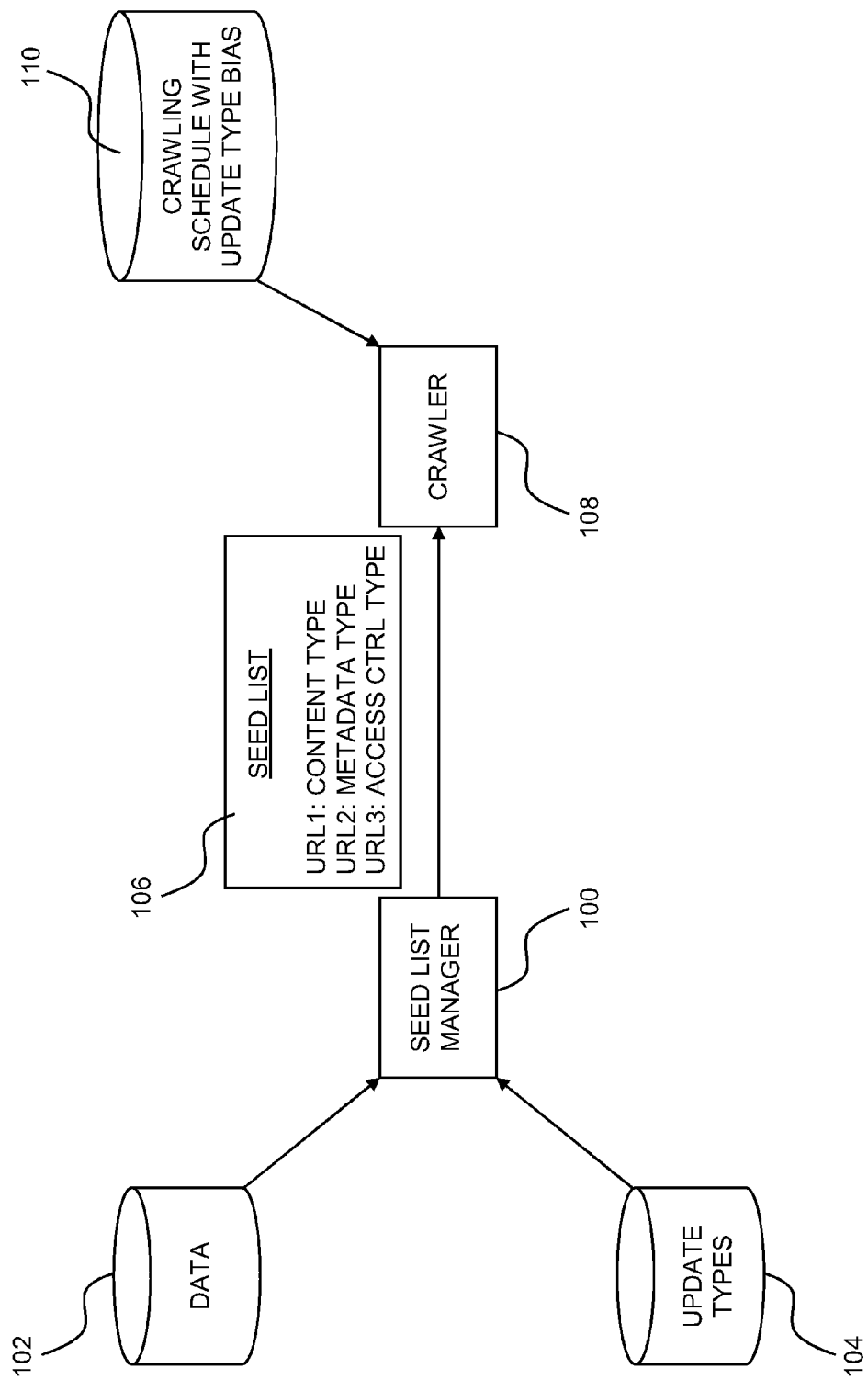
FIG. 1A is a simplified conceptual illustration of a system for data-discriminate search engine updates, constructed and operative in accordance with embodiments of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks. The code implementing the described operations may further be implemented in hardware logic or circuitry (e.g., an integrated circuit chip, Programmable Gate Array (PGA), Application Specific Integrated Circuit (ASIC), etc.

Reference is now made to FIG. 1A which is a simplified conceptual illustration of a system for data-discriminate search engine updates, constructed and operative in accordance with embodiments of the invention. In the system of FIG. 1A a seed list manager 100 is configured to determine if updates have been made to a collection of data 102, where data 102 may include any type of indexable data, such as HTML documents and related data objects, stored on one or more data storage devices on one or more computers (not shown). Seed list manager 100 is configured to distinguish between different types of updates made to data 102 in accordance with a set of predefined update types 104. Update types 104 may, for example, be defined such that seed list manager 100 distinguishes between updates classified as "content-type" updates, such as updates made to HTML document body contents, versus updates classified as "metadata-type" updates, such as updates made to HTML document header contents, versus updates classified as "access control information-type", such as updates made to the list of individuals who may access a particular HTML document. It will be appreciated that additional or alternative update types may be predefined. Seed list manager 100 preferably periodically determines if updates have been made to data 102, such as relative to a last time seed list manager 100 examined data 102 to determine whether updates occurred.

Seed list manager 100 is configured to compile a seed list 106 of one or more references to locations where data 102 that have been determined to have been updated are found, such as where the references are in the form of uniform resource locators (URLs) or other types of links identifying the location of the updated data 102. Each reference is preferably provided together with an indicator indicating of the type of update that was made to the data 102 at the reference location. Optionally, where more than one type of update was made to data 102 at a reference location, the reference may be provided together with multiple corresponding update type indicators, or may be provided together with whichever of the indicators whose update type is predefined as ranking highest among the multiple corresponding update types. Seed list manager 100 provides seed list 106 to a crawler 108 which is configured to process data 102, typically by accessing and indexing data 102.

Crawler 108 is configured to process data 102 at the reference locations indicated in seed list 106 in accordance with a crawling schedule 110. Crawling schedule 110 is preferably configured to cause crawler 108 to process data 102 associated with one type of update more frequently than data 102 associated with another type of update. For example, crawling schedule 110 may be configured such that crawler 108 processes data 102 that have undergone a "access control information-type" update twice as often as data 102 that have undergone a "content-type" update, and four times as often as data 102 that have undergone a "metadata-type" update. This may, for example, be implemented by crawler 108 by processing data 102 associated with only one type of update in a given session, such as according to the following schedule:

1:00 pm Access control information-type
1:10 pm Content-type
1:20 pm Access control information-type
1:30 pm Content-type
1:40 pm Access control information-type
1:50 pm Metadata-type
2:00 pm Access control information-type
2:10 pm Access control information-type
2:20 pm Content-type
. . .

Thus, in the above example, during the 1:00 pm crawling session crawler 108 only processes data 102 at those reference locations in seed list 106 that are associated with an "access control information-type" update indicator, and ignores data 102 at those reference locations in seed list 106 that are not associated with an "access control information-type" update indicator. During the 1:10 pm crawling session crawler 108 only processes data 102 at those reference locations in seed list 106 that are associated with a "content-type" update indicator, and ignores data 102 at those reference locations in seed list 106 that are not associated with a "content-type" update indicator.

The system of FIG. 1A may be appreciated in the following exemplary context in which there is a desire to crawl and index data in accordance with an update type bias, where data that have undergone one type of update are crawled and indexed more frequently than data that have undergone another type of update. This bias allows data updates to be accorded greater or lesser importance with respect to updating a search engine index, and allows system load to be reduced overall by updating the search engine index in a discriminate manner. Thus, for example, where updates to data access control information are considered to be more important than updates to data content, a search engine index of the data may be updated more frequently for access control information updates than for content updates.

Figure 1B:
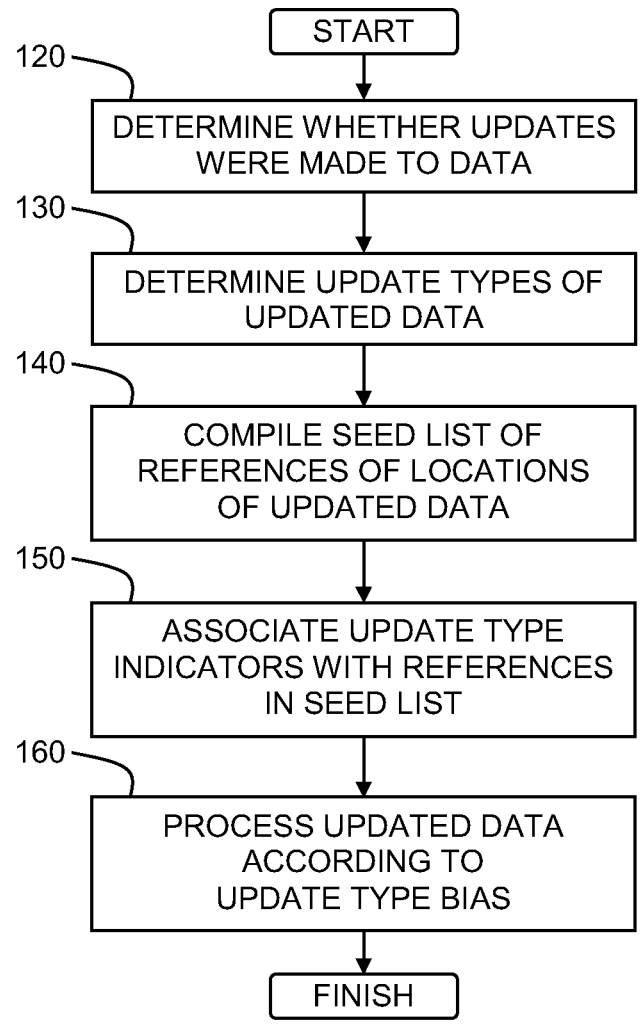
FIG. 1B is a simplified flowchart illustration of an exemplary method of operation of the system of FIG. 1A, operative in accordance with embodiments of the invention.

Reference is now made to FIG. 1B, which is a simplified flowchart illustration of an exemplary method of operation of the system of FIG. 1A, operative in accordance with embodiments of the invention. In the method of FIG. 1B, a determination is made of whether updates were made to any items in a collection of data (block 120). Where it is determined that data were updated, a determination is made of the type of update that was made (block 130) in accordance with a set of predefined update types. A seed list is compiled of one or more references to locations where data that have been determined to have been updated are found (block 140). An indicator is associated with each reference in the seed list indicating of the type of update that was made to the data (block 150). The data at the reference locations indicated in the seed list are processed in accordance with a crawling schedule where data associated with one type of update is processed more frequently than data associated with another type of update (block 160).

Figure 2A:
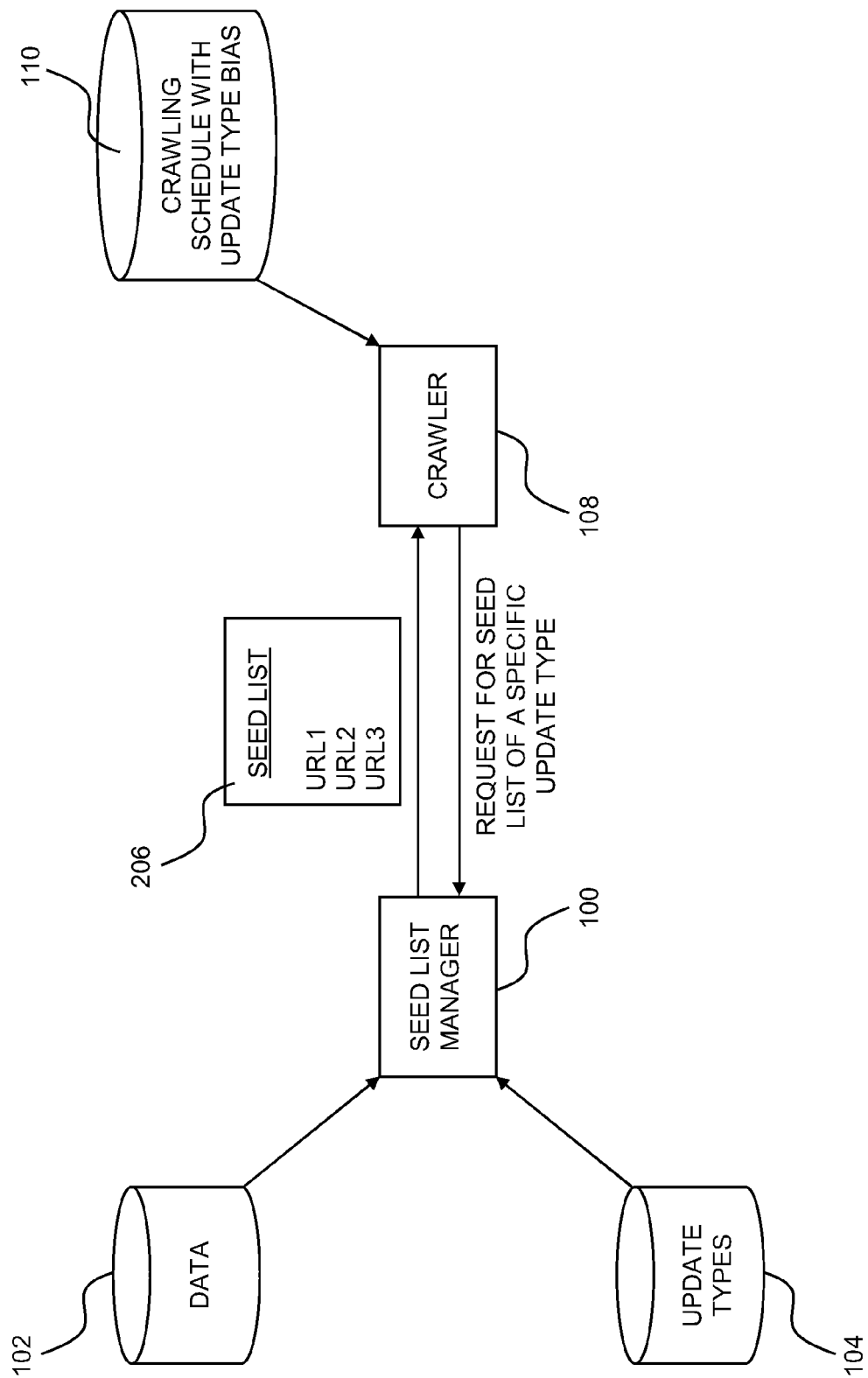
FIG. 2A is a simplified conceptual illustration of a system for data-discriminate search engine updates, constructed and operative in accordance with embodiments of the invention.
Figure 2B:
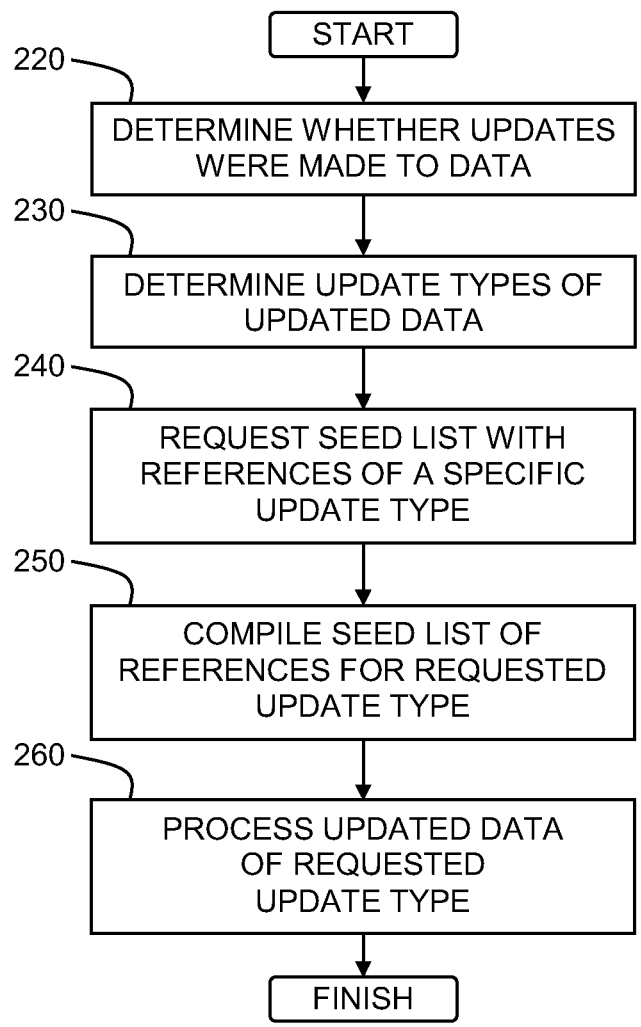
FIG. 2B is a simplified flowchart illustration of an exemplary method of operation of the system of FIG. 2A, operative in accordance with embodiments of the invention.

Reference is now made to FIG. 2A which is a simplified conceptual illustration of a system for data-discriminate search engine updates, constructed and operative in accordance with an alternative embodiment of the invention, and additionally to FIG. 2B, which is a simplified flowchart illustration of an exemplary method of operation of the system of FIG. 2A, operative in accordance with embodiments of the invention. The system and method of FIGS. 2A and 2B are substantially similar to the system and method of FIGS. 1A and 1B, with the notable exception that in FIG. 2A crawler 108 is configured to request seed lists from seed list manager 100 in accordance with crawling schedule 110. In this embodiment crawling schedule 110 is preferably configured to cause crawler 108 to request different types of seed lists at different times, where each seed list 206 includes references to data 102 that are associated with one type of update, and where seed lists with references that are associated with one type of update are requested more frequently by crawler 108 than seed lists with references that are associated with another type of update.

Thus, in the method of FIG. 2B, a determination is made of whether updates were made to any items in a collection of data (block 220). Where it is determined that data were updated, a determination is made of the type of update that was made (block 230) in accordance with a set of predefined update types. A seed list is requested of one or more references to locations where data that have been determined to have been updated are found, where the request is made in accordance with a crawling schedule, where seed lists with references that are associated with one type of update are requested more frequently than seed lists with references that are associated with another type of update (block 240). A seed list is compiled of one or more references to locations where data that have been determined to have been updated are found, where each seed list includes references to data that are associated with one type of update (block 250). The data at the reference locations indicated in the seed list are processed (block 260).

Figure 3:
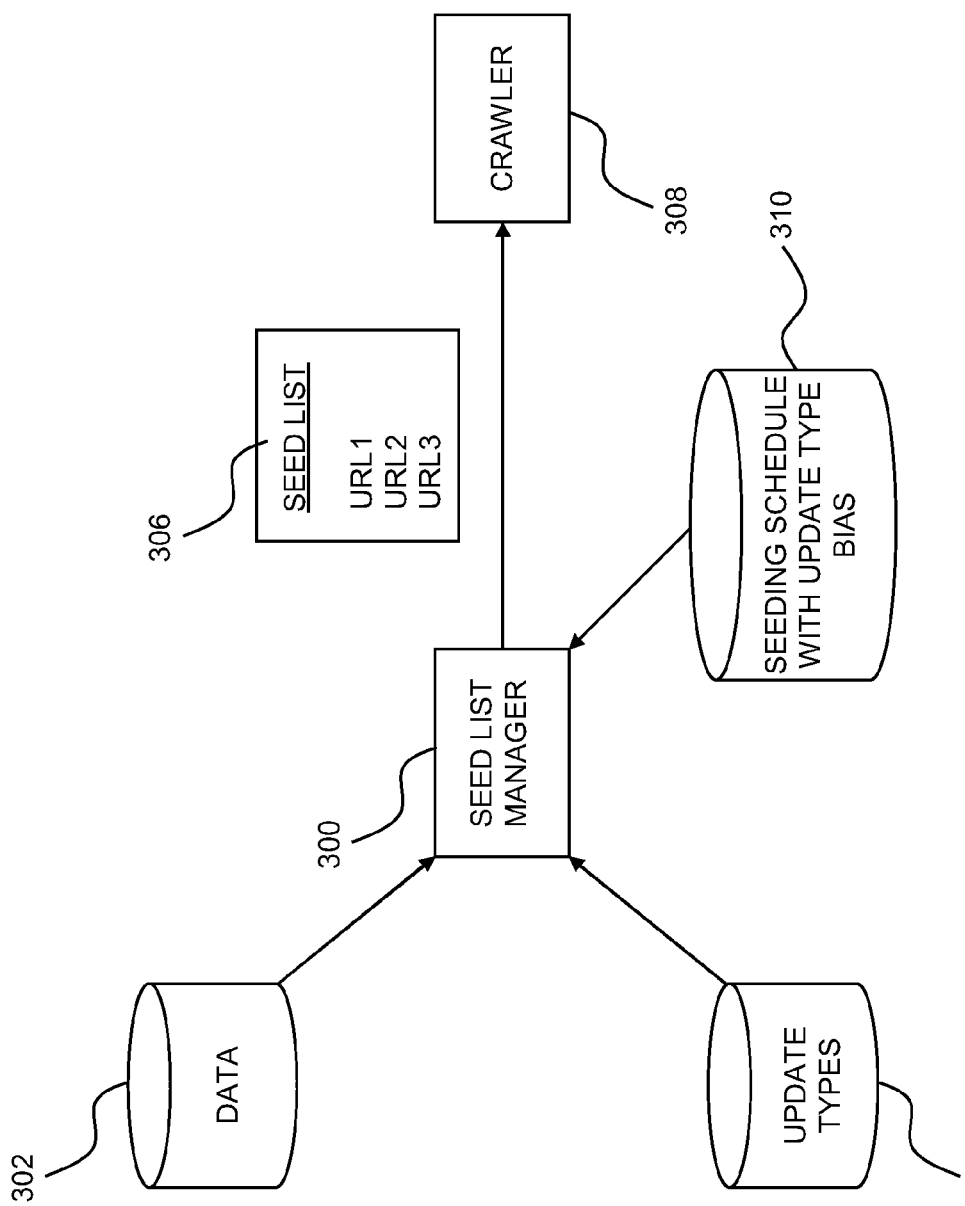
FIG. 3 is a simplified conceptual illustration of a system for data-discriminate search engine updates, constructed and operative in accordance with an alternative embodiment of the invention.

Reference is now made to FIG. 3 which is a simplified conceptual illustration of a system for data-discriminate search engine updates, constructed and operative in accordance with an alternative embodiment of the invention. In the system of FIG. 3 a seed list manager 300 is configured to determine if updates have been made to a collection of data 302, and to distinguish between different types of updates made to data 302 in accordance with a set of predefined update types 304 as described hereinabove with reference to FIG. 1. Seed list manager 300 is configured to compile a seed list 306 of one or more references to locations where data 302 that have been determined to have been updated are found, such as where the references are in the form of uniform resource locators (URLs) or other types of links identifying the location of the updated data 302.

In contrast to the system of FIG. 1, the references in seed list 306 are not provided together with an indicator indicating of the type of update that was made to the data 302 at the reference location. Rather, seed list manager 300 is configured to determine which references to include in seed list 306 in accordance with a seeding schedule 310. Seeding schedule 310 is preferably configured to cause seed list manager 300 to more frequently include in seed list 306 references to data 302 that are associated with one type of update more frequently than references to data 302 that are associated with another type of update. For example, seeding schedule 310 may be configured such that seed list manager 300 includes in seed list 306 references to data 302 that have undergone an "access control information-type" update twice as often as references to data 302 that have undergone a "content-type" update, and four times as often as references to data 302 that have undergone a "metadata-type" update. This may, for example, be implemented by seed list manager 300 by including in a given seed list 306 references to data 302 that are associated with only one type of update, such as according to the following schedule:

1:00 pm Access control information-type
    1:10 pm Content-type
    1:20 pm Access control information-type
    1:30 pm Content-type
    1:40 pm Access control information-type
    1:50 pm Metadata-type
    2:00 pm Access control information-type
    2:10 pm Access control information-type
    2:20 pm Content-type
    . . .

Thus, in the above example, at 1:00 pm seed list manager 300 compiles seed list 306 to include only reference locations whose data 302 have undergone an "access control information-type" update, and ignores those reference locations whose data 302 have not undergone a "access control information-type" update. At 1:10 pm seed list manager 300 compiles seed list 306 to include only reference locations whose data 302 have undergone a "content-type" update indicator, and ignores those reference locations whose data 302 have not undergone a "content-type" update.

Seed list manager 300 provides seed list 306 to a crawler 308 which is configured to process data 302, typically by accessing and indexing data 302. In contrast to crawler 108 of FIG. 1, crawler 308 does not operate according to a crawling schedule that is configured to cause crawler 308 to process data 302 associated with one type of update more frequently than data 302 associated with another type of update, although crawler 308 may operate according to a crawling schedule that is otherwise configured (not shown). Thus, crawler 308 processes the references in seed list 306 without regard to the update types of their underlying data. Nevertheless, the end result is the same as that of FIG. 1, since in a given crawling session crawler 308 only processes data 302 that are associated with only one type of update.

Figure 4:
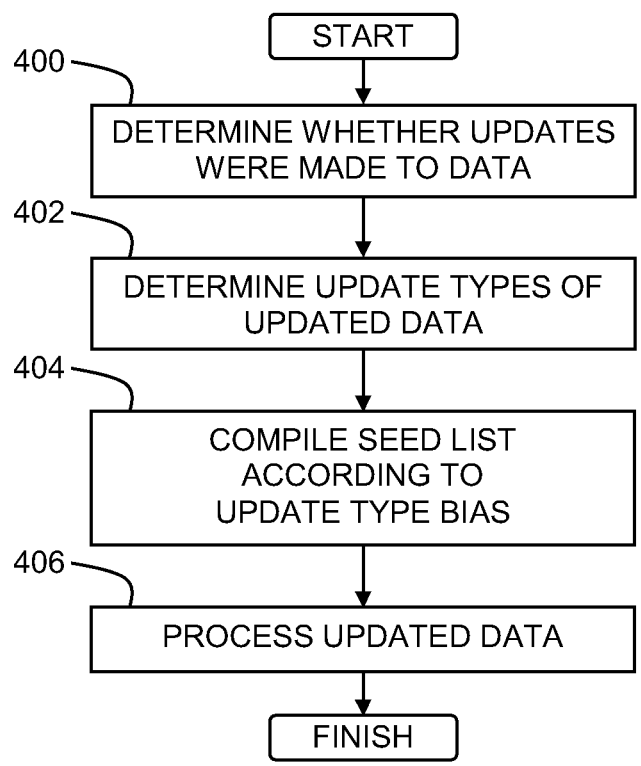
FIG. 4 is a simplified flowchart illustration of an exemplary method of operation of the system of FIG. 3, operative in accordance with embodiments of the invention.

Reference is now made to FIG. 4, which is a simplified flowchart illustration of an exemplary method of operation of the system of FIG. 3, operative in accordance with embodiments of the invention. In the method of FIG. 4, a determination is made of whether updates were made to any items in a collection of data (block 400). Where it is determined that data were updated, a determination is made of the type of update that was made (block 402) in accordance with a set of predefined update types. A seed list is compiled of one or more references to locations where data that have been determined to have been updated are found, where the reference locations are included in the seed list in accordance with a seeding schedule where reference locations of data associated with one type of update are included more frequently than reference locations of data associated with another type of update (block 404). The data at the reference locations indicated in the seed list are processed (block 406).

Figure 5:
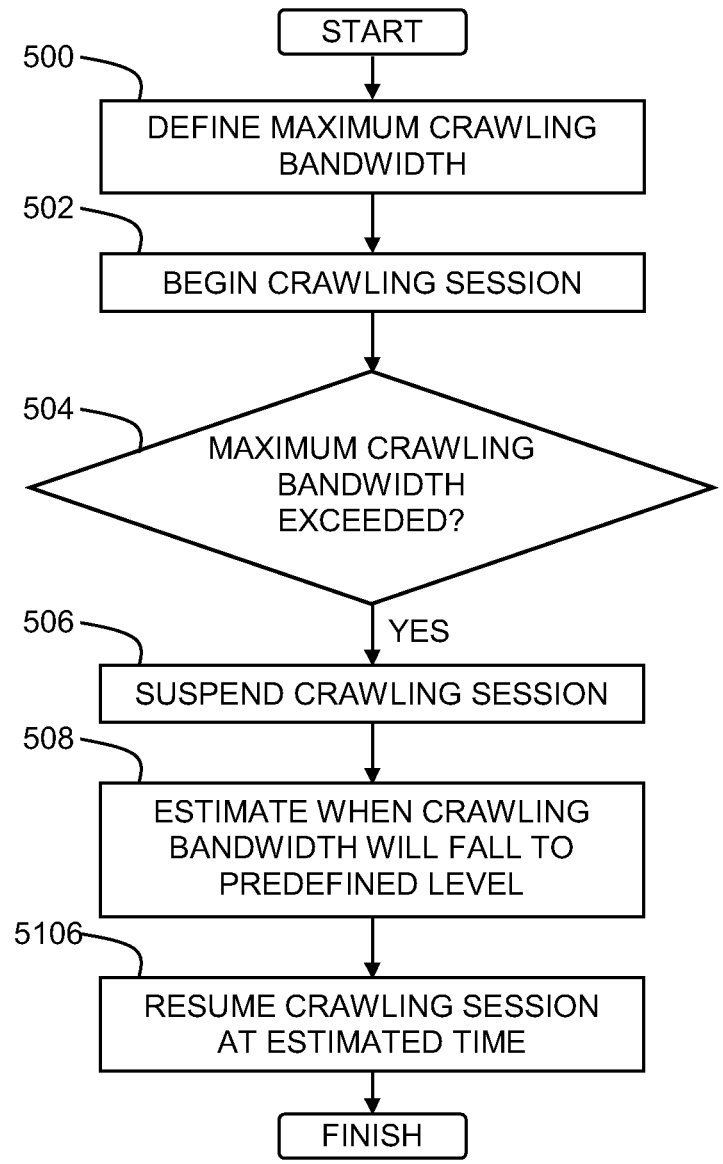
FIG. 5 is a simplified flowchart illustration of a method for data-discriminate search engine updates, constructed and operative in accordance with alternative embodiments of the invention.

Reference is now made to FIG. 5 which is a simplified flowchart illustration of a method for data-discriminate search engine updates, operative in accordance with an alternative embodiment of the invention. In the method of FIG. 5, which may be used in conjunction with any of the embodiments of the invention described hereinabove, a maximum crawling bandwidth is predefined, such as an average of 100 kilobits per second when calculated over a predefined time period, such as one hour (block 500). A single maximum crawling bandwidth may be predefined, or multiple maximum crawling bandwidth values may be predefined according to a schedule, such as where higher maximum crawling bandwidth values are defined for hours where there is low system demand, such as between 9 pm and 6 am, and lower maximum crawling bandwidth values are defined for hours where there is high system demand, such as between 6 am and 9 pm. Crawling sessions are initiated, such as is described hereinabove, and crawling bandwidth is monitored (block 502). During any crawling session by a crawler, if the maximum crawling bandwidth applicable to the crawling session, such as may be monitored by the crawler, is exceeded by the crawler (block 504), then the crawling session is suspended (block 506), preferably after completing the processing of a current data item being processed, such as a document or document page. Using conventional techniques, a calculation is made, such as by the crawler, to estimate when the bandwidth for the current crawling session will fall below the maximum crawling bandwidth, such as to 90% of the maximum crawling bandwidth or to any other predefined level (block 508). The crawling session is then resumed at the estimated time (block 510).

Figure 6:
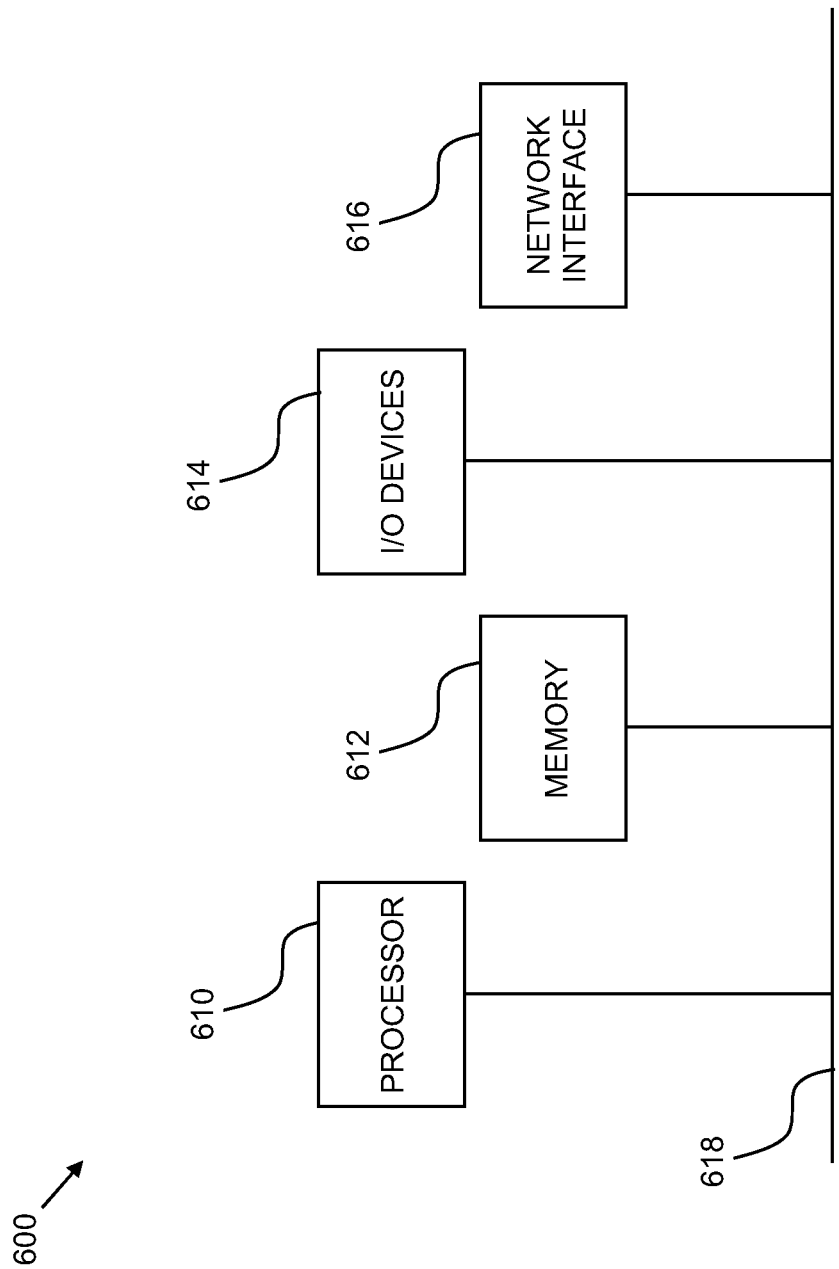
FIG. 6 is a simplified block diagram illustrating an exemplary hardware implementation of a computing system, constructed and operative in accordance with embodiments of the invention.

Referring now to FIG. 6, block diagram 600 illustrates an exemplary hardware implementation of a computing system in accordance with which one or more components/methodologies of the invention (e.g., components/methodologies described in the context of the drawing figures shown and described herein) may be implemented, according to embodiments of the invention.

As shown, the techniques for controlling access to at least one resource may be implemented in accordance with a processor 610, a memory 612, I/O devices 614, and a network interface 616, coupled via a computer bus 618 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

Since many embodiments may be made without departing from the spirit and scope of the invention, the embodiments reside in the claims hereinafter appended or any subsequently-filed claims, and their equivalents.

What is claimed is:

1. A method for data-discriminate search engine updates, the method comprising:
   identifying, with a processor of a computer, references to locations at which data has been updated, wherein each of the references has one or more associated indicators that each indicate a type of update that was made to the data, wherein the type of update includes a first update type that is based on an update made to a list of individuals allowed to access the data, a second update type that is based on an update made to metadata;
   determining different crawling session frequencies based on the type of update, wherein the first update type is crawled more frequently than the second update type; and
   updating a search engine index at the different crawling session frequencies for the first update type and the second update type.

2. The method of claim 1, further comprising:
   identifying an update to a first set of data as being of the first update type; and
   identifying an update to a second set of data as being of the second update type.

3. The method of claim 1, further comprising:
   compiling a seed list including
      a first reference to a location where a first set of data are found,
      a first indicator associated with the first reference and indicating the first update type,
      a second reference to a location where a second set of data are found, and
      a second indicator associated with the second reference and indicating the second update type.

4. The method of claim 1, further comprising:
   in accordance with a first crawling session frequency associated with the first update type, compiling a first seed list including a reference to a location where a first set of data are found, and
   in accordance with a second crawling session frequency associated with the second update type, compiling a second seed list including a reference to a location where a second set of data are found.

5. The method of claim 1, further comprising:
   in accordance with a first crawling session frequency associated with the first update type, requesting a first seed list including a reference to a location where a first set of data are found, and
   in accordance with a second crawling session frequency associated with the second update type, requesting a second seed list including a reference to a location where a second set of data are found.

6. The method of claim 1, wherein one of a first crawling session and a second crawling session comprises a current crawling session, and further comprising:
   suspending the current crawling session in response to determining that a maximum crawling bandwidth applicable to the current crawling session is exceeded during the current crawling session;
   estimating a time when a bandwidth of the current crawling session will fall below the maximum crawling bandwidth; and
   resuming the current crawling session at the estimated time.

7. The method of claim 6, wherein the suspending comprises suspending after completing processing of a current data item.

8. The method of claim 6, wherein the estimating comprises estimating when the current crawling session bandwidth will fall to a predefined level.

9. A system for data-discriminate search engine updates, the system comprising:
   a processor; and
   a storage device coupled to the processor, wherein the storage device stores a program, and wherein the processor is configured to execute the program to perform operations, wherein the operations comprise:
      identifying references to locations at which data has been updated, wherein each of the references has one or more associated indicators that each indicate a type of update that was made to the data, wherein the type of update includes a first update type that is based on an update made to a list of individuals allowed to access the data, a second update type that is based on an update made to metadata;
      determining different crawling session frequencies based on the type of update, wherein the first update type is crawled more frequently than the second update type; and
      updating a search engine index at the different crawling session frequencies for the first update type and the second update type.

10. The system of claim 9, wherein the operations further comprise:
    compiling a seed list including
       a first reference to a location where a first set of data are found,
       a first indicator associated with the first reference and indicating the first update type,
       a second reference to a location where a second set of data are found, and
       a second indicator associated with the second reference and indicating the second update type.

11. The system of claim 9, wherein the operations further comprise:
    compiling a first seed list in accordance with a first crawling session frequency associated with the first update type, wherein the first seed list includes a reference to a location where a first set of data are found, and compiling a second seed list in accordance with a second crawling session frequency associated with the second update type, wherein the second seed list includes a reference to a location where a second set of data are found.

12. The system of claim 9, wherein the operations further comprise:
  requesting a first seed list in accordance with a first crawling session frequency associated with the first update type, wherein the first seed list includes a reference to a location where a first set of data are found, and
  requesting a second seed list in accordance with a second crawling session frequency associated with the second update type, wherein the second seed list includes a reference to a location where a second set of data are found.

13. The system of claim 9, wherein one of a first crawling session and a second crawling session comprises a current crawling session, and wherein the operations further comprise:
  suspending the current crawling session in response to determining that a maximum crawling bandwidth applicable to the current crawling session is exceeded during the current crawling session,
  estimating a time when a bandwidth of the current crawling session will fall below the maximum crawling bandwidth, and
  resuming the current crawling session at the estimated time.

14. The system of claim 13, wherein the crawling session is suspended after completing processing of a current data item.

15. The system of claim 13, wherein the estimating comprises estimating when the current crawling session bandwidth will fall to a predefined level.

16. A computer program product for data-discriminate search engine updates, the computer program product comprising a non-transitory computer-readable storage medium with computer-readable program code embodied therein, wherein the computer-readable program code, executable by a processor of a computer, is configured to:
  identify references to locations at which data has been updated, wherein each of the references has one or more associated indicators that each indicate a type of update that was made to the data, wherein the type of update includes a first update type that is based on an update made to a list of individuals allowed to access the data, a second update type that is based on an update made to metadata;
  determining different crawling session frequencies based on the type of update, wherein the first update type is crawled more frequently than the second update type; and
  update a search engine index at the different crawling session frequencies for the first update type and the second update type.

17. The computer program product of claim 16, wherein the computer-readable program code, executable by a processor of a computer, is configured to:
  identify the update to a first set of data as being of the first update type, and
  identify the update to a second set of data as being of the second update type.

18. The computer program product of claim 16, wherein one of a first crawling session and a second crawling session comprises a current crawling session, and wherein the computer-readable program code, executable by a processor of a computer, is configured to:
  suspend the current crawling session in response to determining that a maximum crawling bandwidth applicable to the current crawling session is exceeded during the current crawling session,
  estimate a time when a bandwidth of the current crawling session will fall below the maximum crawling bandwidth, and
  resume the current crawling session at the estimated time.

19. The computer program product of claim 18, wherein the computer-readable program code, executable by a processor of a computer, is configured to suspend the crawling session after completing processing of a current data item.

20. The computer program product of claim 18, wherein the computer-readable program code, executable by a processor of a computer, is configured to estimate when the current crawling session bandwidth will fall to a predefined level.

* * * * *